Patented Jan. 15, 1952

2,582,283

UNITED STATES PATENT OFFICE 2,582,283

FLUORINE-CONTAINING LUBRICANT

Alexander N. Sachanen, Woodbury, N. J., assignor to Socony-Vacuum Oil Company, Incorporated, a corporation of New York No Drawing. Application August 10, 1950, Serial No. 178,749

4 Claims. (Cl. 260—648)

This invention has to do with new synthetic lubricants characterized by an especially desirable combination of properties, particularly high viscosity index and excellent chemical and thermal stability. More specifically, this invention relates to fluorine-containing hydrocarbons, or fluorohydrocarbons so characterized.

Considerable effort has been expended in the past to develop lubricants having a combination of desirable properties, with emphasis being directed to high viscosity index (V. I.) and stability under rigorous operating conditions. While the paraffinic-type lubricants, typified by Pennsylvania oils, have relatively high viscosity indices, they have not been able to satisfy the demands of present day operations in regard to chemical and thermal stability. Naphthenic- and aromatic-type lubricants, illustrated by Mid-Continent and Coastal oils, have undesirably low viscosity indices. Such disadvantageous characteristics of conventional oils have been countered or eliminated, in some instances, by incorporating with the oils one or more adjuvants, particularly V. I. improvers, oxidation inhibitors or stabilizers, and the like. In many cases, however, the improvement realized has been insufficient. For example, lubricating oils for high-pressure compressors handling oxygen. Conventional petroleum and synthetic organic lubricating oils burn rapidly on operation of compressing and frequently form explosive mixtures with oxygen. There remains today, therefore, a demand for lubricants of sufficiently high V. I. and stability.

Among the materials hitherto proposed as possible lubricants, in view of their exceptional chemical and thermal stability, are the fluorocarbons $F_aC_b$, wherein $a$ and $b$ are integers. Unfortunately, however, it has been found that fluorocarbons are uniformly characterized by low V. I. values and high pour points. For example, a perfluorinated octadecane has a calculated V. I. of —430. Fluorine-containing organic compounds have also been proposed as lubricants. Here again, the success was rather limited. By way of illustration, fluorine-containing compounds obtained by decomposing fluorine-containing polymers of tetrafluoroethylene and chlorotrifluoroethylene, have proven to be semi-solids or oily materials having poor viscosity indices and/or excessively high pour points. Other fluorine-containing compounds have been noted for their exceptional stability, and among such compounds are the polyfluorocyclobutanes described by Barrick in U. S. Letters Patent 2,441,-128 and 2,462,345. The polyfluorocyclobutanes described therein, however, are not suitable for use as lubricants; some are solids, others are of low viscosity and suitable for use as solvents and reaction media.

As I have described with H. L. Coonradt and B. W. Rope in a related and copending application Serial No. 178,747, filed concurrently herewith, polyfluoromonocyclobutanes represented by general Formula I, below, have desirably high V. I., chemical and thermal stability, and satisfactory pour characteristics:

I 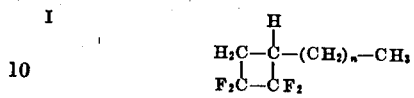

wherein $n$ is an integer from about 11 to about 19, and is preferably from about 13 to about 17.

I have now found that a new and novel, related group of polyfluorodicyclobutanes have a substantially greater degree of stability, particularly resistance to oxidation, then have the materials represented by the foregoing general Formula I, in addition to satisfactory viscosity index and satisfactory pour characteristics. The polyfluorodicyclobutanes contemplated herein are those represented below by general Formula II:

II 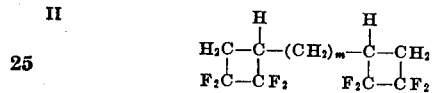

wherein $m$ is an integer from about 10 to about 18, and is preferably from about 12 to about 16.

It is believed that accumulation of highly stable carbonfluorine structures at both ends of the paraffinic drain stabilizes the compound with reference to the effect of air or oxygen at high temperatures.

The polyfluorodicyclobutanes of this invention are prepared by reaction of tetrafluoroolefin (III) with an alpha olefinic, straight chain polyfluoromonocyclobutane (IV), namely:

III, IV 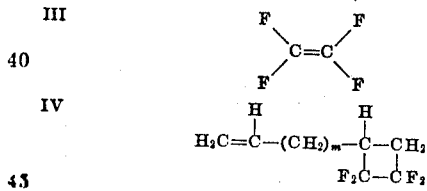

wherein $m$ is as defined above.

Temperature of reaction can be varied over a wide range, as from about 200° F. to about 800° F. It will be understood, of course, that excessively high temperatures at which the reactants and/or products decompose, are to be avoided. In general, temperatures within the range of 400° F. to 600° F. are preferred. Pressure attending the reaction depends upon the nature of the reactants, equipment and other reaction conditions such as temperature. Generally, high pressures favor the reaction. Satisfactory operations involve autogenous pressures from about 400 to about 600 pounds per square inch. Reaction is generally carried out in a closed system; however, the reactants can also be passed continuously through a hot tube.

Reaction of the aforesaid olefins and tetrafluoroethylene is quite rapid as indicated by a decrease in pressure when the reactants are brought together at a suitable temperature. Thus, the reaction time can be as low as several minutes, or can be extended, depending upon the nature of the reactants, temperature, etc. Reaction periods between about one-half hours and about two hours are advantageous.

The proportion of tetrafluoroethylene (III) and of the alpha olefinic, straight-chain polyfluoromonocyclobutane (IV) are also susceptible of variation, although the principal reaction involves the combination of equimolar quantities of the two reactants. One competing reaction is the polymerization of the alpha olefinic polyfluoromonocyclobutane; however, under the conditions of reaction, i. e. at 500° F. or below, this is of minor consequence. Another side reaction is the dimerization of tetrafluoroethylene (III). To avoid the latter reaction, it is advisable to slowly add the polyfluoromonocyclobutane (IV) to tetrafluoroethylene (III), making use of the technique described in copending application Serial No. 178,748, filed concurrently herewith.

It is also within the scope of this invention to perform the reaction either by a batch process or a continuous process, and to recycle unconverted reactants for further reaction.

Catalysts and/or inhibitors are not required in effecting reaction of the foregoing reactants. It will be understood, of course, that a polymerization inhibitor can be incorporated into the reaction mixture, if desired, particularly to inhibit polymerization of tetrafluoroethylene, although present investigations indicate that an inhibitor is not essential.

The alpha olefinic, straight-chain polyfluoromonocyclobutanes of general Formula IV are prepared from saturated polyfluoromonocyclobutanes (I). Reaction conditions for preparing a saturated polyfluoromonocyclobutane (I) are described in related and copending applications Serial Nos. 178,747 and 178,748. The saturated polyfluoromonocyclobutane obtained is cracked in a vapor phase at 500–550° C. to produce an alpha mono-olefin, polyfluoromonocyclobutane of the character represented by general Formula IV. The reaction conditions suitable for cracking the corresponding saturated polyfluoromonocyclobutanes are similar to those used for cracking paraffin wax and similar paraffinic materials such as slack wax, foots oils, etc. Cracking of the latter materials under low pressures is described in my text "Conversion of Petroleum," second edition, 1948, Reinhold Publishing Co., page 16. As it is known, vapor phase cracking of paraffins at atmospheric pressure produces alpha olefins and saturated paraffins of low molecular weight such as methane and ethane. In the same manner vapor phase cracking of a straight-chain polyfluoromonocyclobutane produces straight-chain alpha olefin-polyfluoromonocyclobutanes according to the equations as follows:

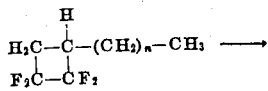

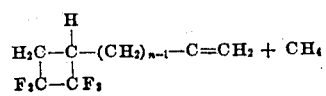

or

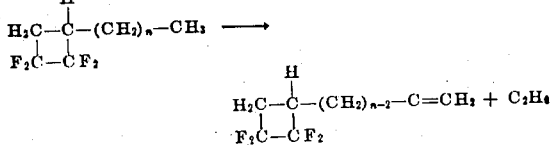

It should also be possible to prepare the polyfluorodicyclobutanes (II) of this invention by adding two molar proportions of tetrafluoroethylene to a normal, alpha-omega diolefin having from about fourteen to about twenty-two carbon atoms per molecule, under the conditions recited above for preparing the corresponding polyfluoromonocyclobutanes (IV). However, normal alpha-omega diolefins of such chain length are not presently available for study. There is every indication that such diolefins would be suitable sources of the desired products (II).

As shown in related application Serial No. 178,747, a polyfluoromonocyclobutane (IV), such as 1-hexadecyl-2,2,3,3-tetrafluorocyclobutane, is a synthetic lubricant of high quality. It has a high viscosity index, good pour characteristics and a high degree of stability. In the last-mentioned regard, it is markedly superior to solvent-refined Pennsylvania oils which have long been considered premium lubricants. In one respect, however, polyfluoromonocyclobutanes are not entirely satisfactory, namely, in their resistance to extreme oxidation conditions in contact with metal surfaces, and particularly lead, exhibiting a catalytic action. This short-coming has now been substantially countered by the polyfluorodicyclobutanes (II) of this invention.

Another advantage of the polyfluorodicyclobutanes resides in their relatively high fluorine content coupled with their extreme stability. These materials are non-inflammable and excellent for use in high-pressure oxygen compressors. A compound of the formula $C_4F_4H_3$—$(CH_2)_{16}$—$C_4F_4H_3$, e. g., contains about 32% fluorine, effecting the non-inflammability of the compound.

I claim:

1. A compound represented by general formula

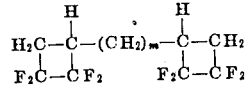

wherein $m$ is an integer from about ten to about eighteen.

2. A compound as defined by claim 1 wherein $m$ is an integer from about twelve to about sixteen.

3.

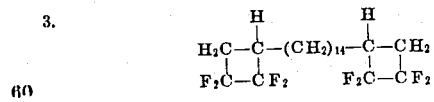

4.

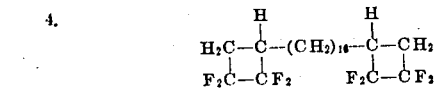

ALEXANDER N. SACHANEN.

REFERENCES CITED

The following references are of record in the file of this patent:

UNITED STATES PATENTS

| Number | Name | Date |
| --- | --- | --- |
| 2,427,116 | Barrick | Sept. 9, 1947 |
| 2,462,345 | Barrick | Feb. 22, 1949 |
| 2,462,347 | Barrick | Feb. 22, 1949 |